(12) United States Patent
Green

(10) Patent No.: US 6,817,647 B1
(45) Date of Patent: Nov. 16, 2004

(54) COLLAPSIBLE TOP FOR ATV

(76) Inventor: Johnnie R. Green, P.O. Box 59, Slabfork, WV (US) 25920-0059

( * ) Notice: Subject to any disclaimer, the term of this patent is extended or adjusted under 35 U.S.C. 154(b) by 0 days.

(21) Appl. No.: 10/811,053

(22) Filed: Mar. 29, 2004

(51) Int. Cl.[7] .................................................. B60J 1/00
(52) U.S. Cl. ..................................... 296/77.1; 296/102
(58) Field of Search ........................... 296/107.01, 109, 296/102, 104, 105, 77.1

(56) References Cited

U.S. PATENT DOCUMENTS

| | | | |
|---|---|---|---|
| 745,022 A | | 11/1903 | Loftus |
| 2,479,036 A | * | 8/1949 | Campbell ................... 296/102 |
| 3,201,171 A | | 8/1965 | Wickard |
| 3,733,103 A | | 5/1973 | Hansen |
| 4,950,017 A | * | 8/1990 | Norton ...................... 296/77.1 |
| 5,174,622 A | * | 12/1992 | Gutta ........................ 296/77.1 |
| 5,203,601 A | * | 4/1993 | Guillot ...................... 296/77.1 |
| 5,458,390 A | * | 10/1995 | Gilbert ...................... 296/102 |
| 5,509,717 A | | 4/1996 | Martin |
| 5,961,175 A | * | 10/1999 | Clardy, Jr. ................. 296/77.1 |
| 6,155,279 A | | 12/2000 | Humphrey |
| 6,206,446 B1 | | 3/2001 | Slayden |
| 6,402,220 B2 | * | 6/2002 | Allen ........................ 296/77.1 |
| 6,530,617 B2 | * | 3/2003 | McElwee et al. ......... 296/77.1 |
| 6,543,830 B1 | | 4/2003 | Stuck |

FOREIGN PATENT DOCUMENTS

GB    2241477 A  *  9/1991

* cited by examiner

*Primary Examiner*—Jason Morrow
(74) *Attorney, Agent, or Firm*—Donald R. Schoonover

(57) ABSTRACT

A top for use on an All-Terrain-Vehicle (ATV) includes a plurality of flexible sections that are supported by support rods located in tubes in the sections. Some of the sections include transparent windows, and one of the sections has a manually operated windshield wiper thereon. Straps are used to releasably mount the top on an ATV. Joint elements are also included so a support rod from one flexible section can be releasably attached to a support rod in another flexible section. Closure elements, such as zippers, are used to releasably attach several of the flexible sections together.

2 Claims, 1 Drawing Sheet

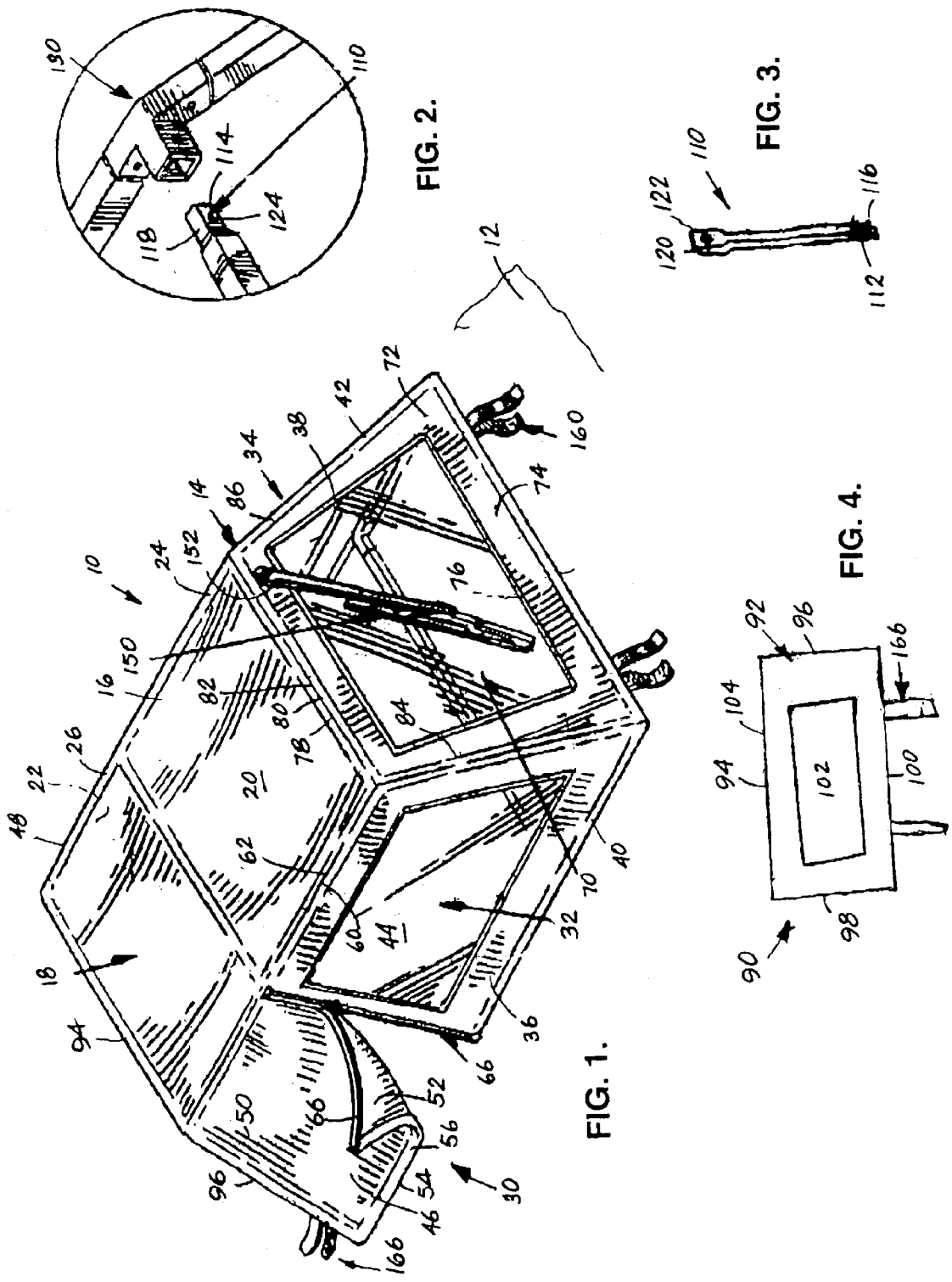

US 6,817,647 B1

COLLAPSIBLE TOP FOR ATV

BACKGROUND OF THE INVENTION

1. Field of the Invention

The present invention relates to the general art of motor vehicles, and to the particular field of tops and accessories.

2. Discussion of the Related Art

Many people enjoy riding in an All-Terrain-Vehicle (ATV). Such vehicles are used for work, recreation, camping, and simply riding about. The vehicles are used on all types of terrain.

Riding ATVs is most pleasant when the weather is pleasant. However, many people start a trip in an ATV when the weather is pleasant only to have the weather turn inclement during the trip. The ATV rider is thus caught in the inclement weather. Most ATVs do not have any means for protecting the rider against the elements and thus the rider will get rained on, or snowed on, or worse.

Therefore, there is a need for a top that can be used on an ATV to protect the rider against the elements.

In most situations, however, the top will not be desired. Therefore, in most situations, the top should be stored and out of the way.

Therefore, there is a need for a top that can be used on an ATV to protect the rider against the elements and which can be stored when not needed or desired.

If an ATV rider is caught in a downpour, it is most desirable that the top be removed from storage and put in place as quickly and easily as possible. A rider does not want to be fumbling with complex elements while exposed to a downpour.

Therefore, there is a need for a top that can be used on an ATV to protect the rider against the elements and which can be stored when not needed or desired and which can be quickly and easily erected when desired.

PRINCIPAL OBJECTS OF THE INVENTION

It is a main object of the present invention to provide a top that can be used on an ATV to protect the rider against the elements.

It is another object of the present invention to provide a top that can be used on an ATV to protect the rider against the elements and which can be stored when not needed or desired.

It is another object of the present invention to provide a top that can be used on an ATV to protect the rider against the elements and which can be stored when not needed or desired and which can be quickly and easily erected when desired.

SUMMARY OF THE INVENTION

These, and other, objects are achieved by a collapsible top for an ATV. The top includes a plurality of sections formed of flexible material. The sections have tubes which can accommodate support rods and some of the sections are connected by closure elements, such as zippers, or the like. The top also includes joint elements so a support rod from one section can be coupled to a support rod of another section. Some of the sections have translucent or transparent windows that includes straps that are used to releasably attach the top to the frame of the ATV. The top also includes a manually operable windshield wiper.

Using the ATV top embodying the present invention will permit an ATV rider to have protection against the elements, but only when needed and desired. The top can be stored when not needed or desired, and can be very quickly and easily attached to the ATV.

BRIEF DESCRIPTION OF THE DRAWING FIGURES

FIG. 1 is a perspective view of a top for an ATV embodying the present invention.

FIG. 2 is a detailed view showing a connection between two frame elements of the top shown in FIG. 1.

FIG. 3 shows a frame element of the top shown in FIG. 1.

FIG. 4 is an elevational view of a rear unit of the top shown in FIG. 1.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a collapsible top 10 for an ATV. The overall unit comprises an ATV 12, which is only indicated in FIG. 1.

A top unit 14 includes first section top 16 and second top section 18. Each top section 16, 18 includes a first surface 20, which is an outside surface when the top unit 14 is in a use orientation on the ATV, and a second surface 22 which is an inside surface when in the use orientation on the ATV. Each section 16, 18 further includes a plurality of edges, such as edge 24. A hem, such as hem 26, is defined in each edge 24 of each section 16 and 18. Each hem 26 forms a tube.

A side unit 30 includes a first window section 32 and a second window section 34. Each window section 32, 34 is formed of flexible material and includes a first surface 36, which is an outside surface when the side unit 30 is in a use orientation on the ATV, and a second surface 38, which is an inside surface when the side unit 30 is in the use orientation on the ATV. A plurality of edges, such as edge 40, are defined on each section 32, 34 of the side unit 30, and a hem, such as hem 42, is defined in each edge 40 of each window section 32, 34. Translucent or transparent material 44 is in each window section 32, 34 of the side unit 30.

The side unit 30 further includes two rear sections, 46 and 48. Each rear section 46, 48 is formed of flexible material and further includes a first surface 50, which is an outside surface when the side unit is in a use orientation on the ATV, and a second surface 52, which is an inside surface when the side unit 30 is in the use orientation on the ATV. Each of the rear sections 46, 48 has a plurality of edges, such as edge 54, and has a hem, such as hem 56, defined in each edge 54 of each rear section 46, 48.

Each window section 32, 34 has one edge, such as edge 60, that is one piece with one edge, such as edge 62, of the first top section 16.

A zipper fastener element, such as element 66, is located on an edge 40 of each window section 32, 34 and an adjacent edge of each rear section 46, 48.

The top unit 14 further includes a front unit 70 which includes a front section 72 which is formed of flexible material and which further includes a first surface 74, which is an outside surface when the front unit 70 is in a use orientation on the ATV, and a second surface 76, which is an inside surface when the front unit 70 is in the use orientation on the ATV. The front section 72 has a plurality of edges, such as edge 78, and a hem, such as hem 80, defined in each edge 78 of the front section 72 of the window unit. A first edge 82 of the front section 72 of the front unit 70 is one-piece with an edge of the first top section 16 of the top unit 14, a second edge 84 of the front section 72 of the front unit 70 is one-piece with an edge of the first window section 32 of the side unit 30, and a third edge 86 of the front section 72 of the front unit 70 is one-piece with an edge of the second window section 34 of the side unit 30. A rear unit 90 includes a flexible rear section 92 which has a first edge 94 which is one piece with an edge of the second top section 18, a second edge 96 which is one piece with an edge of one of the two rear sections 46, 48 of the side unit 30, a third edge 98 which is one piece with an edge of a second one of the two rear sections 48, 46 of the side unit 30, and a fourth edge 100 that is located adjacent to the ATV when the rear unit 90 is in a use condition. The rear section 92 of the rear unit 90 further includes a translucent or transparent window 102 and a hem, such as hem 104, defined in each of the first 94, second 96, third 98 and fourth 100 edges of the rear section 92 of the rear unit 90.

The top unit 14 further includes a plurality of support rods, such as support rod 110 shown in FIG. 3, each of which is located in a hem when the top unit 14 is in the use condition. Each support rod includes a first end 112 and a second end 114. One end 116 of each rod can be flared and the other end 118 narrowed to be accommodated in a flared end of an adjacent rod. The flared end can include a blind-ended bore 120 which has notches 122 defined therein, and the narrowed 118 end can have projections 124 thereon which are received in the notches 122 to lock a rod to an adjacent rod. A plurality of joint elements, such as joint element 130, couple adjacent support rods together when the top 14, side 30, front 70 and rear 90 units are in the use orientations on the ATV. The joint element shown in FIG. 2 forms a 75° angle and is located between the top unit 14 and the front unit 70. A similar joint is located between the top unit 14 and the rear unit 90. The joints located at other locations in the top unit 14 form 90° angles as will be understood by those skilled in the art based on the teaching of the present disclosure.

A manually operated windshield wiper 150 is mounted on the front unit 70. The manually operated windshield wiper 150 includes a handle 152 located adjacent to the second surface 76 of the front section 72 of the front unit 70.

A plurality of front strap elements, such as element 160, are mounted on a fourth edge of the front section 74 of the front unit 70 and are adapted to releasably attach to an ATV when the front section 74 is in the use orientation.

A plurality of rear strap elements, such as strap element 166, are mounted on a fourth edge of the rear section 92 of the rear unit 90 and are adapted to releasably attach to an ATV when the rear section 92 is in the use orientation.

The top unit 14, the side unit 30, the rear unit 90, and the front unit 70 are all one-piece with each other.

As will be understood from the foregoing, the top unit 14 can be dismantled by simply unzipping the zipper elements 66, removing the rod elements from the hems, removing the straps 160, 166 from the ATV, and then collapsing the unit 10. On the other hand, the top unit 14 can be quickly assembled by inserting the rod elements into the hems, attaching the straps 160, 166 to the ATV, and zipping the zipper elements 66.

It is understood that while certain forms of the present invention have been illustrated and described herein, it is not to be limited to the specific forms or arrangements of parts described and shown.

What is claimed is:

1. A collapsible top for an ATV comprising:
   a) an ATV;
   b) a top unit which includes first and second top sections, each top section including
      (1) a first surface which is an outside surface when said top unit is in a use orientation on said ATV,
      (2) a second surface which is an inside surface when in the use orientation on said ATV,
      (3) a plurality of edges, and
      (4) a hem defined in each edge;
   c) a side unit which includes
      (1) first and second window sections, each window section being formed of flexible material and which further includes a first surface which is an outside surface when said side unit is in a use orientation on said ATV, a second surface which is an inside surface when said side unit is in the use orientation on said ATV, a plurality of edges, a hem defined in each edge of each window section, and a transparent material in each window section of said side unit,
      (2) two rear sections, each rear section being formed of flexible material and which further includes a first surface which is an outside surface when said side unit is in a use orientation on said ATV, a second surface which is an inside surface when said side unit is in the use orientation on said ATV, a plurality of edges, a hem defined in each edge of each rear section,
      (3) each window section having one edge that is one-piece with one edge of the first top section,
      (4) a zipper fastener element located on an edge of each window section and an adjacent edge of each rear section;
   d) a front unit which includes a front section being formed of flexible material and which further includes a first surface which is an outside surface when said front unit is in a use orientation on said ATV, a second surface which is an inside surface when said front unit is in the use orientation on said ATV, a plurality of edges, a hem defined in each edge of the front section of said window unit, a first edge of the front section of said front unit being one-piece with an edge of the first top section of said top unit, a second edge of the front section of said front unit being one-piece with an edge of the first window section of said side unit, and a third edge of the front section of said front unit being one-piece with an edge of the second window section of said side unit;
   e) a rear unit which includes a flexible rear section having a first edge which is one-piece with an edge of the second top section, a second edge which is one-piece with an edge of one of the two rear sections of said side unit, a third edge which is one-piece with an edge of a second one of the two rear sections of said side unit, and a fourth edge that is located adjacent to said ATV when said rear unit is in a use condition, the rear section of said rear unit further including a transparent window and a hem defined in each of the first, second, third and fourth edges of the rear section of said rear unit;
   f) a plurality of support rods each of which is located in a hem when the rods are in use supporting said top unit;
   g) a plurality of joint elements which couple adjacent support rods together when said top, side, front and rear units are in the use orientations on said ATV;

h) a manually operated windshield wiper mounted on said front unit, said manually operated windshield wiper including a handle located adjacent to the second surface of the front section of said front unit;

i) a plurality of front strap elements mounted on a fourth edge of the front section of said front unit and adapted to releasably attach to an ATV when said front section is in the use orientation;

j) a plurality of rear strap elements mounted on a fourth edge of the rear section of said rear unit and adapted to releasably attach to an ATV when said rear section is in the use orientation; and k) said top unit, said side unit, said rear unit and said front unit all being one-piece with each other.

2. A collapsible top for an ATV comprising:

a) an ATV;

b) a top unit which includes first and second top sections, with each section having a hem;

c) a side unit which includes
  (1) first and second window sections, each window section including a hem and a transparent material,
  (2) two rear sections, each rear section including a hem,
  (3) each window section having one edge that is one-piece with one edge of the first top section,
  (4) a zipper fastener element located on an edge of each window section and an adjacent edge of each rear section;

d) a front unit which includes a front section having a hem, a first edge which is one-piece with an edge of the first top section of said top unit, a second edge of the front section of said front unit being one-piece with an edge of the first window section of said side unit, and a third edge of the front section of said front unit being one-piece with an edge of the second window section of said side unit;

e) a plurality of support rods each of which is located in a hem;

f) a plurality of joint elements which couple adjacent support rods together when said top, side and front units are in the use orientations on said ATV;

g) a manually operated windshield wiper mounted on said front unit, said manually operated windshield wiper including a handle located adjacent to the second surface of the front section of said front unit;

h) a plurality of front strap elements mounted on a fourth edge of the front section of said front unit and adapted to releasably attach to an ATV when said front section is in the use orientation; and i) said top unit, said side unit and said front unit all being one-piece with each other.

\* \* \* \* \*